(12) United States Patent
Lindner et al.

(10) Patent No.: US 9,700,980 B2
(45) Date of Patent: Jul. 11, 2017

(54) SPINDLE UNIT FOR A MACHINING DEVICE WITH A SPINDLE LOCK

(71) Applicant: Schuster Maschinenbau GmbH, Denklingen (DE)

(72) Inventors: Erich Lindner, Landsberg am Lech (DE); Peter Löffler, Germaringen (DE); Christian Steidle, Waldburg (DE)

( * ) Notice: Subject to any disclaimer, the term of this patent is extended or adjusted under 35 U.S.C. 154(b) by 265 days.

(21) Appl. No.: 14/340,843

(22) Filed: Jul. 25, 2014

(65) Prior Publication Data

US 2015/0033918 A1    Feb. 5, 2015

(30) Foreign Application Priority Data

Jul. 30, 2013 (DE) .................. 10 2013 012 765

(51) Int. Cl.
*B23Q 5/20* (2006.01)
*B23Q 5/04* (2006.01)
(Continued)

(52) U.S. Cl.
CPC ............... *B23Q 5/20* (2013.01); *B23Q 5/043* (2013.01); *B23Q 16/00* (2013.01); *B23Q 5/10* (2013.01);
(Continued)

(58) Field of Classification Search
CPC ....... B23B 13/027; B24B 23/022; B23Q 5/20; B23Q 11/0092; B23Q 16/08; B23Q 16/10;
(Continued)

(56) References Cited

U.S. PATENT DOCUMENTS 2,538,229 A * 1/1951 Boden ..................... F16C 19/36
 384/611
2,603,540 A * 7/1952 Mierley ................ F01D 25/164
 384/611
(Continued)

FOREIGN PATENT DOCUMENTS

DE    39 13 139 C2    10/1992
DE    199 04 688 A1    8/2000
(Continued)

OTHER PUBLICATIONS

DE 10257610 Machine Translation, pp. 4-7, Nov. 21, 2016.*
DE 10 2013 012 765.3 Search Report mailed May 22, 2014.

*Primary Examiner* — Sunil K Singh
*Assistant Examiner* — Nicole N Ramos
(74) *Attorney, Agent, or Firm* — Royse Law Firm, PC

(57) ABSTRACT

Spindle units are provided for machining devices, in particular for a lathing spindle unit, center drive assembly or milling spindle unit. The spindle unit comprises: a spindle shaft rotatably supported in a housing, a chucking device disposed at the spindle shaft for clamping a workpiece or a tool, a motor drive connected to the spindle shaft for driving the spindle shaft around a drive axis, a clamping device for clamping the spindle shaft at a freely selectable angular position around the drive axis, wherein the clamping device is disposed between the spindle shaft and a stationary part of the spindle unit, and an actuating device for actuating and/or releasing the clamping device. The clamping device can be axially actuated in the direction of the drive axis such that an axial or substantial axial clamping force acts in the direction of the drive axis with the clamping device being actuated.

17 Claims, 7 Drawing Sheets

(51) Int. Cl.
  *B23Q 16/00* (2006.01)
  *B23Q 16/10* (2006.01)
  *B23Q 11/00* (2006.01)
  *B23Q 15/26* (2006.01)
  *B23Q 5/10* (2006.01)

(52) U.S. Cl.
  CPC .......... *B23Q 11/0092* (2013.01); *B23Q 15/26* (2013.01); *B23Q 16/10* (2013.01); *Y10T 82/10* (2015.01); *Y10T 82/2562* (2015.01); *Y10T 409/309352* (2015.01)

(58) Field of Classification Search
  CPC .......... B23Q 15/26; Y10T 409/309352; Y10T 409/309464; Y10T 74/1502
  See application file for complete search history.

(56) References Cited

U.S. PATENT DOCUMENTS

| | | | |
|---|---|---|---|
| 2,812,186 A | 11/1957 | Carlsen | |
| 2,947,061 A | 8/1960 | Carlsen | |
| 3,042,391 A * | 7/1962 | Glaser | F16F 1/02 267/181 |
| 4,480,366 A * | 11/1984 | Takahashi | B23B 29/04 29/26 A |
| 4,570,313 A * | 2/1986 | Holmstrom | B23Q 3/12 29/26 A |
| 4,832,545 A * | 5/1989 | Babel | B23Q 5/20 409/218 |
| 4,856,153 A * | 8/1989 | Gusching | B23B 29/046 29/26 A |
| 4,913,605 A * | 4/1990 | Schwartzman | B23B 31/207 409/231 |
| 4,973,221 A * | 11/1990 | Anderson | F01D 25/04 188/379 |
| 5,388,934 A * | 2/1995 | Harkness | B23Q 1/4828 409/131 |
| 6,073,323 A | 6/2000 | Matsumoto | |
| 6,337,142 B2 * | 1/2002 | Harder | 428/573 |
| 2004/0194269 A1 | 10/2004 | Geissler | |
| 2008/0305724 A1* | 12/2008 | Kitatsuji | B24B 9/005 451/282 |
| 2010/0258397 A1* | 10/2010 | Tatsuda | B23Q 5/56 188/382 |

FOREIGN PATENT DOCUMENTS

| | | | | |
|---|---|---|---|---|
| DE | 10257610 B3 * | 6/2004 | | B23Q 1/40 |
| EP | 0 259 517 A1 | 3/1988 | | |

* cited by examiner

SPINDLE UNIT FOR A MACHINING DEVICE WITH A SPINDLE LOCK

CROSS-REFERENCE TO RELATED APPLICATIONS

This application claims priority under 35 U.S.C. 119 to German Patent Application No. 10 2013 012 765.3 filed on Jul. 30, 2013 and entitled "Spindle Unit for a Machining Device with a Spindle Lock" which is incorporated herein by reference.

BACKGROUND

A workpiece chucked (or clamped) in a lathing spindle unit is rotationally driven for machining. Upon standstill of the spindle unit, the chucked workpiece can additionally be machined for example with a drill or a milling cutter. In order to ensure precise workpiece machining, the workpiece must be securely retained in a predefined angular position by the spindle unit. For example, for fixing or locking the spindle shaft, a brake can be used, e.g. an expansion sleeve disposed on the spindle shaft. If the expansion sleeve expands or deforms radially outwards, the spindle shaft is secured or clamped in its position.

SUMMARY

The invention relates to a spindle unit for a machining device, in particular for a lathing spindle unit, center drive assembly or milling spindle unit, and a workpiece machining device with at least one such spindle unit.

It is the object of the invention to provide a spindle unit for a machining device and a workpiece machining device with such a spindle unit as well as a method for locking a spindle unit, which provide secure machining of workpieces.

In various embodiments a spindle unit is provided, for example a milling spindle unit or a lathing spindle unit. Preferably, the spindle unit can be used for both clamping (or chucking) and rotationally driving a workpiece or a tool (e.g. drill/milling cutter). For example, the spindle unit or several spindle units can be used in a vertically or horizontally oriented machining device. Therein, vertical and horizontal, respectively, relates to the orientation of the rotation or processing axis of the spindle unit(s). For clamping a workpiece or a tool, a chucking device is fixed or attached to the spindle shaft. A motor drive is connected to the spindle shaft such that the spindle shaft can be driven about its drive axis or rotation axis. For example, the spindle unit is formed as a motor spindle, i.e. the spindle shaft is directly driven, wherein the motor shaft preferably at the same time constitutes the spindle shaft.

The clamping device can be actuated or is operable in axial direction or the actuating device effects movement of the clamping device or a clamping element of the clamping device in the direction of the drive axis. With actuated (or operated) clamping device, an axial or substantially axial clamping action/force acts in the direction of the drive axis. Unless otherwise noted, in the following, the term "axial" relates to the drive axis of the spindle shaft or spindle unit. Preferably, with actuated clamping device the clamping force acts between two axially opposing or substantially opposing ends of the clamping device.

In the above described conventional expansion sleeve radially expanding for locking a spindle shaft, with high rotational speeds of the spindle shaft and the centrifugal forces occurring therein, there is the risk that the (released) expansion sleeve radially deforms and unintentionally decelerates the spindle or heats it by friction. In contrast, the clamping device according to the invention is axially actuated or moves in axial direction to generate an axially acting clamping force, i.e. the centrifugal forces occurring during operation of the spindle unit cannot unintentionally actuate or operate the clamping device. Thereby, secure machining of a workpiece is possible at all times.

In some embodiments, the spindle unit can be formed as a center lathing spindle or center drive assembly, such that e.g. a rod-shaped workpiece can be centrally clamped and be machined at both ends (at the same time).

Preferably, the spindle unit has a clamping device disposed between the spindle shaft and a fixed or stationary part of the spindle unit. A stationary part of the spindle unit is a part of the spindle unit standing still while rotationally driving the spindle shaft. For example a spindle flange is a stationary part of the housing, via which the spindle housing may be connected to a machine frame or body of a machine in which the spindle unit is arranged, e.g. mounted. The clamping device is configured to retain or clamp the spindle shaft in any freely selectable angular position around the drive axis.

For actuating and/or releasing the clamping device, an actuating device is provided. For example, the clamping device is actuated with a pneumatically or hydraulically driven actuating device. Unless otherwise stated, the spindle shaft is locked or clamped with "actuated clamping device" and the spindle shaft is freely movable around its drive axis with "released clamping device."

In an embodiment, the clamping device is disposed between motor drive and the chucking device. In particular, the clamping device is disposed adjacent or substantially adjacent to the chucking device such that a rotationally secure fixing as close to the chucking device as possible or at the clamped workpiece/tool is effected and thereby the highly precise machining of a workpiece is possible. If in contrast to this configuration, locking is effected at a greater distance to the chucking device, e.g. at or behind the motor drive, then there is the risk that the spindle shaft (e.g. by leverage and torsion forces occurring during machining) cannot exactly hold a clamped (chucked) workpiece in a locked position, whereby the precision of the machining decreases. In some embodiments, the clamping device is disposed between or substantially between an axial end of the spindle housing and the chucking device or in the region of the transition from the axial end of the spindle housing and the chucking device.

Preferably, the clamping device has a first clamping surface rotationally rigidly connected to the housing of the spindle unit and a second clamping surface rotationally rigidly connected to the spindle shaft. The second clamping surface is disposed opposing and preferably parallel to the first clamping surface. The first and/or the second clamping surface are displaceable in axial direction by means of an actuating device such that a gap is optionally adjustable between the clamping surfaces by means of the actuating device ("clamping device released") or the clamping surfaces abut on each other ("clamping device actuated"). Since the housing of the spindle unit (also during operation of the spindle unit—spindle rotates) is fixed or stationary, the first clamping surface connected to the housing is also stationary. For example, if the first and the second clamping surface abut on each other or are pressed to each other, the (rotatable) spindle shaft is rotationally rigidly or rotationally fixedly connected to the (stationary) housing such that the spindle shaft is locked as above described.

Particularly preferred, the clamping device has an actuating device and a clamping element with a second clamping surface. For example, the clamping element is formed as or comprises a clamping disk. By means of the actuating device, the clamping element or the section of the clamping element, on which the clamping surface is disposed, can be actuated in axial direction such that clamping is effected by the second clamping surface abutting against a first clamping surface. Additionally or alternatively, the clamping element is actuated in (an opposite) axial direction to release the clamping by removing the second clamping surface from the first clamping surface.

For example, with actuated clamping device, two metallic clamping surfaces act on each other or at least two metallic surfaces are clamped against each other. Alternatively, one clamping surface or both clamping surfaces can for example be covered by a (brake) lining or be roughened such that the static friction between the clamping surfaces is increased in order to thus in turn improve the retaining effect with consistent clamping force or contact pressure.

The clamping surfaces of the clamping device are preferably mated with each other with respect to their surface shape. With mutual abutment of the surfaces, therein, a gap or gap area is not present. However, the clamping surfaces can also be (slightly) curved and for example completely abut on each other or completely abut on each other over an area only by clamping and deformation. The basic shape of the surfaces is preferably perpendicular to the spindle axis, but can also be formed inclined (e.g. cone surface shaped).

Preferably, the first and/or the second clamping surface are formed smooth or substantially smooth or do not have a structured surface. In particular, the clamping surfaces do not have an indentation and angular division. Thereby, the spindle shaft can be continuously locked or clamped at arbitrarily adjustable angles. Preferably, the clamping device, in particular a clamping element of the clamping device, is connected to the spindle shaft or alternatively connected to the stationary part of the spindle unit. For example, a clamping element is screwed and/or form-fit connected to the spindle shaft. By means of the actuating device, a non-stationary end of the clamping element can then be pressed against the stationary part of the spindle unit or a part of the clamping unit, in particular against a spindle flange. For instance, in this configuration, the clamping element rotates (with released clamping device) together with the spindle shaft around the drive axis. Alternatively, if the clamping element is connected to the stationary part of the spindle unit, the clamping element is stationary or it stands still during the operation of the spindle unit.

Particularly preferred, a clamping element of the clamping device is axially, i.e. in the direction of the drive axis, elastically deformable or resiliently/flexibly formed. For example, upon actuation, the clamping element (fixed to an end or a side) can be stretched or expanded in axial direction from a starting position such that the elastically deformable clamping element again contracts in axial direction or resumes its starting position upon releasing the clamping device. Alternatively, the clamping element is compressed, biased or preloaded in the released starting position and upon actuation, the clamping element expands in axial direction upon actuation, for example such that the first and the second clamping surface are pressed to each other by means of the preload of the clamping element.

According to a further embodiment, the clamping element has a first annular section, a cylindrical or cone envelope shaped section and a second annular section, wherein the cylindrical or cone envelope shaped section is preferably elastically deformable in axial direction. In an embodiment, only one annular section can also be provided. Preferably, the first annular section and the cylindrical or cone envelope shaped section and/or the second annular section and the cylindrical or cone envelope shaped section are integrally or monolithically formed. Preferably, the clamping element is formed of a solid or monolithic material, for example stainless steel.

Preferably, the axial extension of the clamping element increases in the direction of the drive axis upon actuating the clamping device (thus upon clamping). For example, with released clamping device, a clamping gap is present between the two clamping surfaces of the clamping device. Upon actuating the clamping device, the clamping element is axially stretched, biased or tensioned by means of the actuating device, such that the first and the second clamping surface of the clamping device abut on each other or are pressed to each other. Upon releasing the clamping, the resilient/elastic clamping element resumes its original shape. In particular, the axial extension of the clamping element automatically decreases upon releasing the clamping device. Since the clamping element is fixed on a side or an (axial) end, the restoring force of the elastic or resilient clamping element effects that the clamping gap is again present between the two clamping surfaces. Thereby, it is ensured that the clamping surfaces are securely spaced to each other or that the clamping surfaces do not unintentionally contact each other with released clamping device or actuating device.

Particularly preferred, the clamping element has at least three elongated recesses or openings in a plane perpendicular or substantially perpendicular to the drive axis such that the clamping element is elastically deformable in axial direction. For example, at least three slot-shaped recesses imparting the resilient or elastic characteristic in axial direction to the clamping element. Preferably, the longitudinal axes of the (elongated) recesses extend parallel to the rotating direction of the spindle shaft. Alternatively, the elongated recesses can be disposed spirally around the circumference of the clamping element. Alternatively or additionally, the clamping element advantageously has an axial expansion device, which prevents torsion around the axis upon axial extension and compression of the clamping element.

Preferably, the recesses of the clamping element are disposed axially offset to each other. For example, elongated recesses are disposed in at least two planes axially spaced to each other such that the recesses or slots of the planes partially overlap or are azimuthally offset or angularly offset to each other. By the number and arrangement of the recesses, a desired elasticity of the clamping device can be simply adjusted.

Particularly preferred, an integral or monolithic clamping element is provided, which can be simply manufactured and is stable. For example, the above described recesses are milled in a cylindrical base body (with clamping surface). Alternatively, the clamping element for example has a spring element, such as a coil spring, to which a clamping part with a continuous clamping surface or several clamping surfaces is attached.

Preferably, the clamping device and/or a clamping element of the clamping device are formed circumferentially around the spindle shaft, in particular annularly. Particularly preferred, the first and/or the second clamping surface of the clamping device are formed circumferentially around the spindle shaft such that the clamping force or action is uniformly acting around the spindle. For example, the clamping element has a continuous (uninterrupted) clamping surface around the spindle shaft.

Preferably, the actuating device is hydraulically or pneumatically actuated. In particular, the actuating device has a piston element actuated by applying hydraulic or pneumatic pressure from a first side in a first axial direction and/or from a second side in a (opposite) second axial direction, wherein the first and the second axial direction are the opposite directions of the spindle axis. For example, upon actuation in the first axial direction, the clamping device is actuated, i.e. the spindle shaft is clamped, and upon actuation in the second axial direction, the clamping device is released or the spindle shaft is released. For example, at least three pistons are provided, which press the clamping element (or the first clamping surface) against the opposing second clamping surface upon actuation in the first axial direction. Alternatively, a continuous annular piston is provided, by means of which the first and the second clamping surface of the clamping device can be pressed to each other and/or again released from each other.

Preferably, a flange-shaped projection or a flange blade is formed on the clamping device or on the clamping element. The first clamping surface of the clamping device is formed on the flange-shaped projection. The clamping surface is increased in radial direction by the projection such that the retaining or holding effect is improved. In an embodiment, the clamping device has a flange-shaped projection on its outer circumference and a first clamping surface of the clamping device is formed on the projection.

Preferably, a clamping gap is present between the opposing clamping surfaces of the clamping device with released clamping device. For example, the (parallel) clamping gap has an extension of at least 0.2 mm, preferably of at least 0.4 mm, is in particular between 0.2 and 0.5 mm in the direction of the rotation or processing axis.

Preferably, the clamping gap or the clamping device is disposed such that an overpressure (sealing air or sealing gas/medium) existing in the inner of the spindle unit prevents foreign substances from entering the clamping gap. For example, the clamping device can be inexpensively connected to an existing sealing air seal for the spindle shaft.

In an embodiment of the spindle unit, the clamping device has an actuating device and a clamping element with a second clamping surface, wherein the clamping element or the section of the clamping element, at which the clamping surface is disposed, can be actuated in axial direction by means of the actuating device for effecting the clamping by abutment of the second clamping surface against a first clamping surface. Alternatively or additionally, the clamping element or the part of the clamping element, on which the clamping surface is disposed, is actuated in axial direction by means of the actuating device for releasing the clamping by removing or displacing the second clamping surface from the first clamping surface.

According to a further aspect of the invention, a machining device with at least one spindle unit as described above is provided. For example, the machining device is formed as a vertical lathe, horizontal lathe, center drive machine with preferably horizontal or vertical spindle axis, or milling machine.

Preferably, a control of the spindle unit or the machining device is adapted to only actuate the clamping device upon standstill of the spindle shaft to secure the spindle shaft in a preset or predetermined angular position. For example, the angular position is controlled by means of a rotary encoder. I.e., the clamping device is not used for decelerating the spindle unit, but only for locking or positionally securing the already standing still spindle shaft.

In the method for locking a spindle unit, the spindle unit comprises a clamping device with a clamping element at least partially displaceable in axial direction of the spindle shaft and the clamping element comprises a second clamping surface displaceable for effecting the clamping in the axial direction against a first clamping surface. The spindle unit and/or the clamping device are advantageously configured according to the above and/or the following description. According to the method, the following steps are provided: positioning the spindle shaft in a predetermined or freely presettable angular position, preferably by controlling the motor drive until the spindle shaft assumes the predetermined angular position; and locking the spindle shaft in the predetermined angular position by displacing the clamping element or a section of the clamping element in axial direction until the first and the second clamping surface abut on each other.

Advantageously, the motor drive is deactivated such that at least the angular positioning is deactivated or preferably the motor is switched force-free in the motor control—during the period of time, in which the spindle shaft is locked. Particularly preferred, the control of the spindle unit or machining device is adapted to deactivate a positional control of the motor drive with actuated clamping device. The clamping device can lock the spindle shaft in any angular position. Therein, it can occur that the freely selectable angular position of the spindle shaft is between two (adjustable) positions of a (more inaccurate) positional control of the (NC) motor drive. In order to prevent intervention of the motor drive control, therefore, the positional control of the motor drive is deactivated with actuated clamping device. In case of an angular deviation in the clamped position sensed by the motor control, this prevents "overheating" of the motor by repositioning pulses, which would actuate against the clamping.

The above described various embodiments and individual features of the spindle unit and the machining device can be combined in any manner.

Based on the figures, embodiments of the invention are explained in more detail. The figures show:

BRIEF DESCRIPTION OF DRAWINGS

FIG. 3 is a partial sectional view of the front area of the spindle unit with chuck of FIG. 1a.

DETAILED DESCRIPTION

Figure 1A:
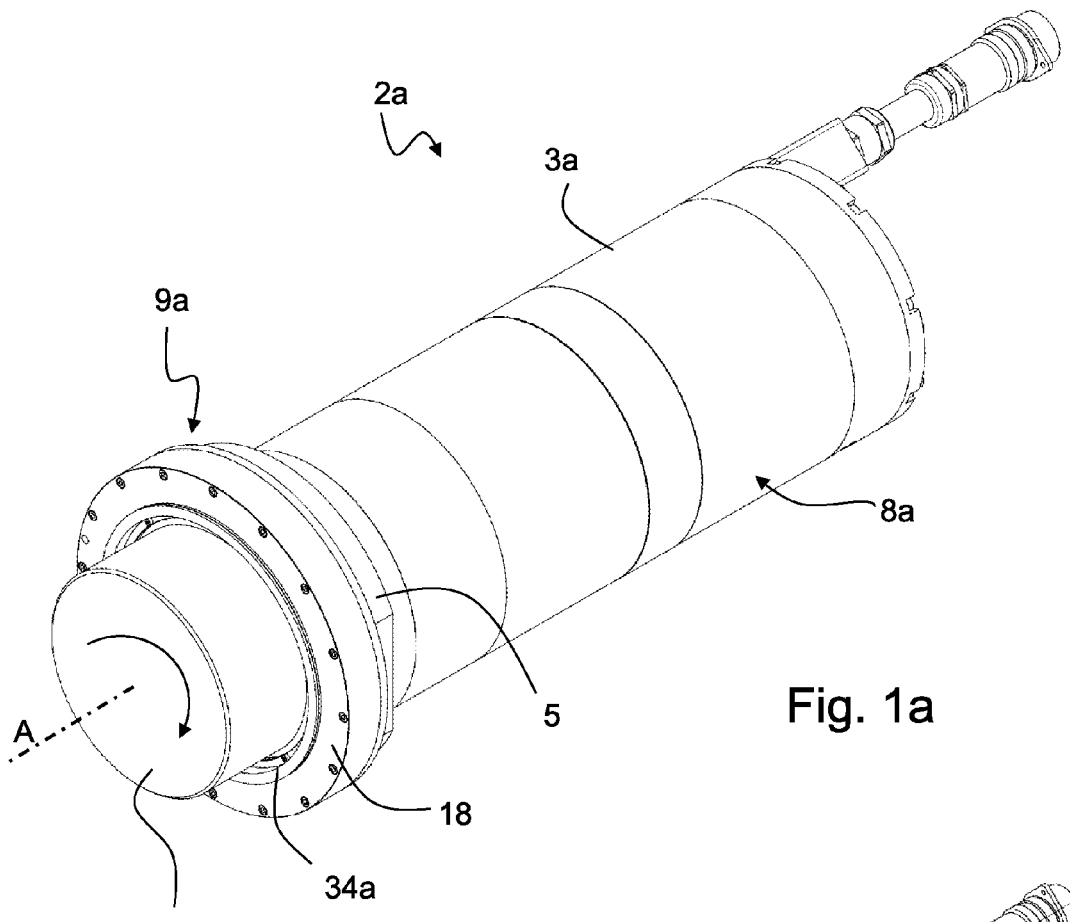
FIG. 1a-b are perspective views of a motor spindle unit having a clamping device; one time with chuck (FIG. 1a) and one time without chuck (FIG. 1b).
Figure 1B:
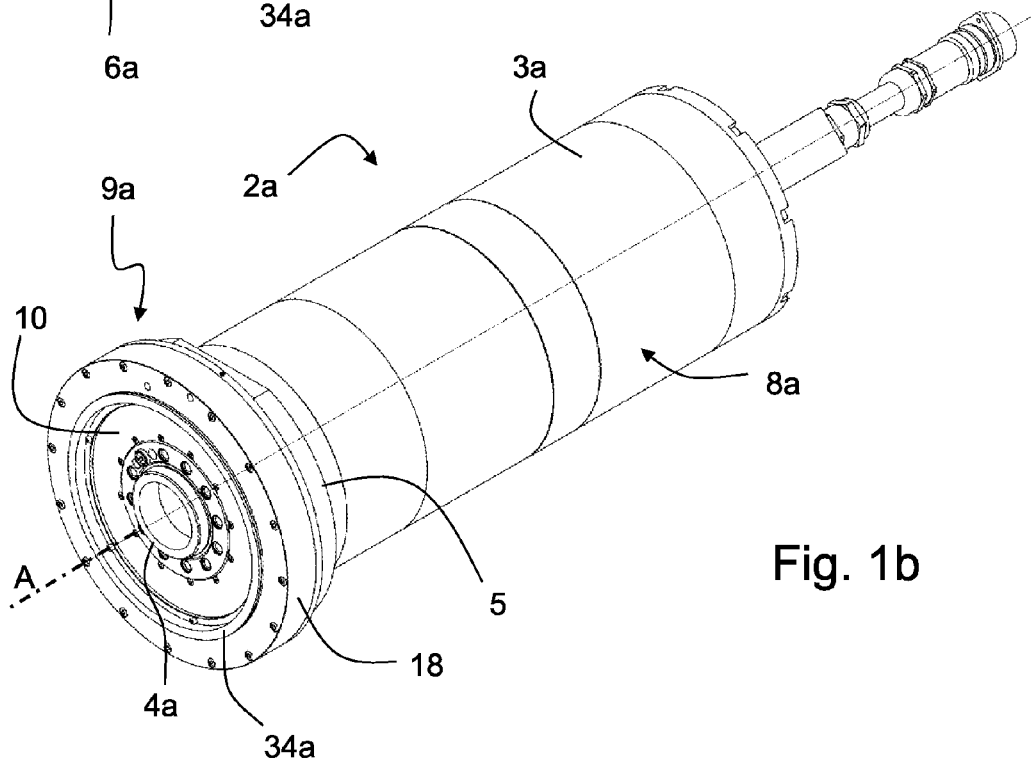

FIGS. 1a and 1b show perspective views of a directly driven spindle unit 2a or a motor spindle unit. FIG. 1a shows the spindle unit with (indicated) chuck or chuck head 6a and FIG. 1b shows the spindle unit 2a without chuck 6a. The spindle unit 2a has a clamping device 9a to lock or clamp a spindle shaft 4a of the spindle unit 2a in a predetermined angular position. In this configuration, the spindle shaft 4a is directly driven, i.e. without transmission between motor drive 8a and shaft 4a, such that the spindle shaft 4a can be rotationally driven around its drive axis A. Therein, the motor shaft of the motor 8a constitutes the spindle shaft 4a. In the chucking device or the chuck 6a, a workpiece or a tool can be chucked or clamped. I.e. the spindle unit is preferably usable as a lathe spindle as well as a milling spindle. For example, the spindle unit 2a or several spindle units 2a (disposed next to each other) can be used in a machining device with vertical or horizontal machining axis (rotation axis).

Figure 2:
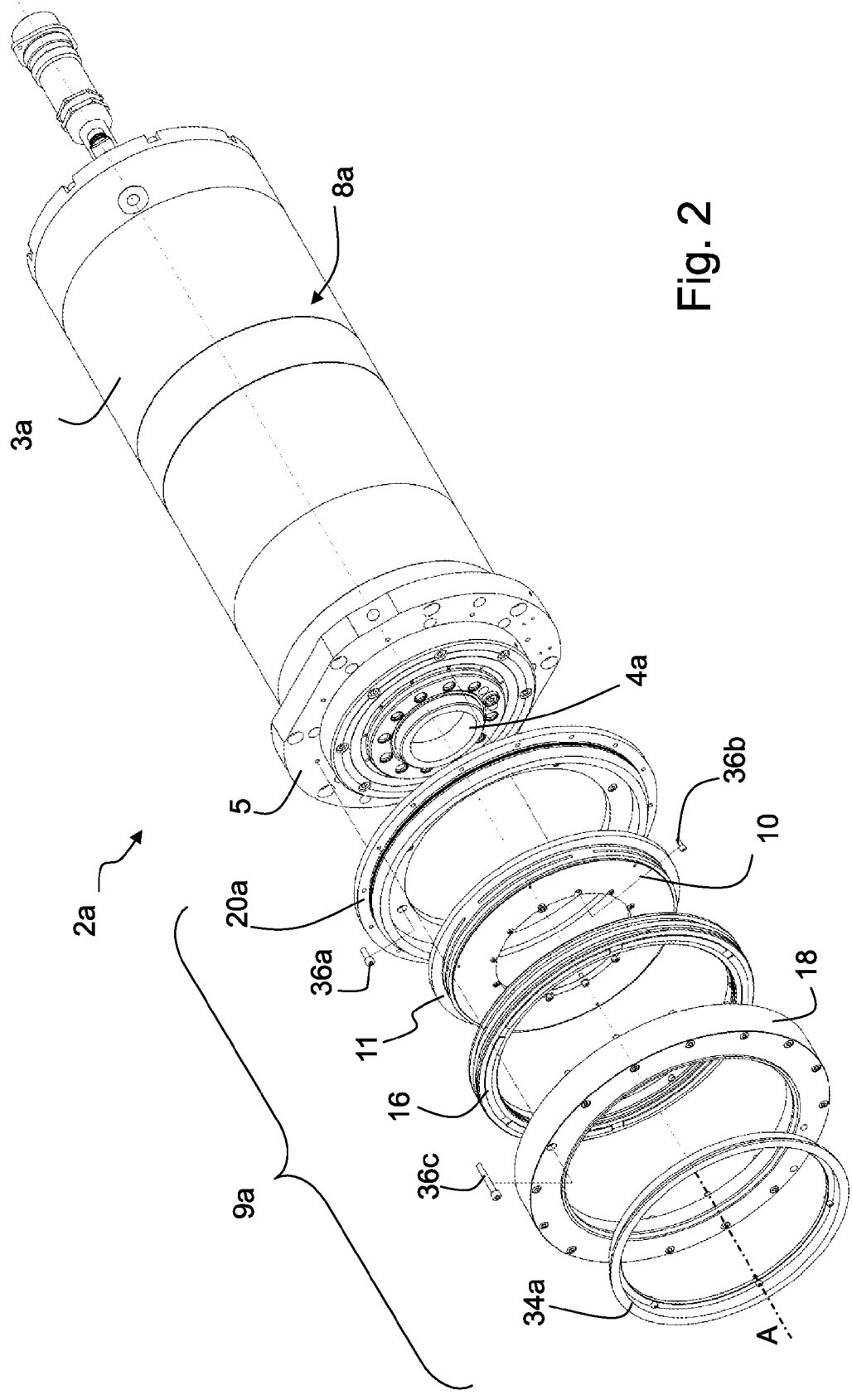
FIG. 2 is a perspective exploded view of the clamping device of the spindle unit of FIG. 1a-b.
Figure 5A:
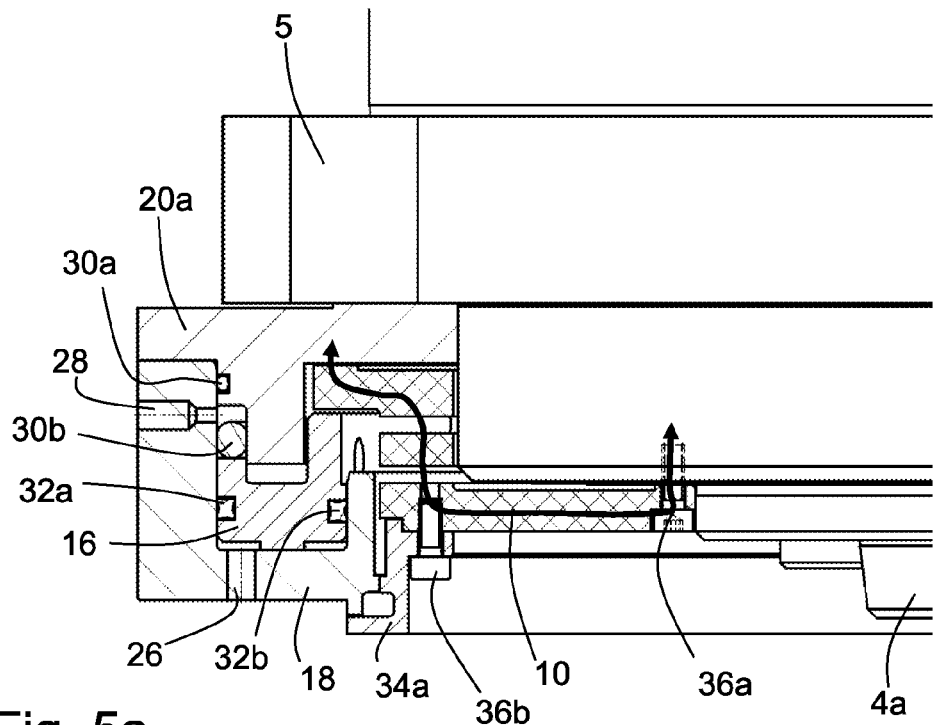
FIG. 5a-b provides details of the clamping device of the spindle unit of FIG. 1a-b.
Figure 5B:
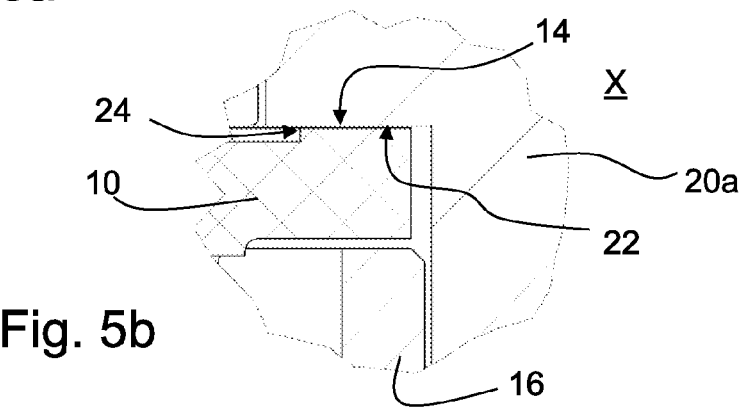

FIG. 2 shows an exploded view of the clamping device 9a of the spindle unit 2a of FIG. 1b. The spindle shaft 4a is supported in a (stationary) housing 3a rotatable around the drive axis A. The housing has a stationary spindle flange 5, to which a receiving flange 20a of the clamping device 9a is attached by means of screws 36a. A clamping disk 10 of the clamping device 9a is received in the receiving flange 20a. The clamping disk 10 is screwed to the spindle shaft 4a by means of screws 36b in its inner region. With released clamping device 9a, a clamping gap 24 is present between clamping disk 10 and receiving flange 20a (or the clamping surface 22 thereof) (FIG. 5b). With released clamping device 9a, the clamping disk 10 rotates together with the spindle shaft 4a.

An annular piston 16 is disposed on the clamping disk 10 or in the clamping device 9a such that the annular piston 16 can be pressed against a flange 11 of the clamping disk 10. The annular piston 16 is guided in a cylinder flange 18 and corresponding feed and discharge lines for a hydraulic or pneumatic actuation of the annular piston 16 are received in the cylinder flange 18 (FIG. 5a). Furthermore, a labyrinth seal or a labyrinth ring 34a is disposed on the cylinder flange 18. The labyrinth ring 34a provides a seal between the rotatable spindle shaft 4a and the stationary cylinder flange 18. In addition, the inner space of the spindle unit 2a can be pressurized (sealing air or sealing medium/gas) to prevent contaminations from entering the spindle unit 2a through the labyrinth ring 34a.

Figure 3:
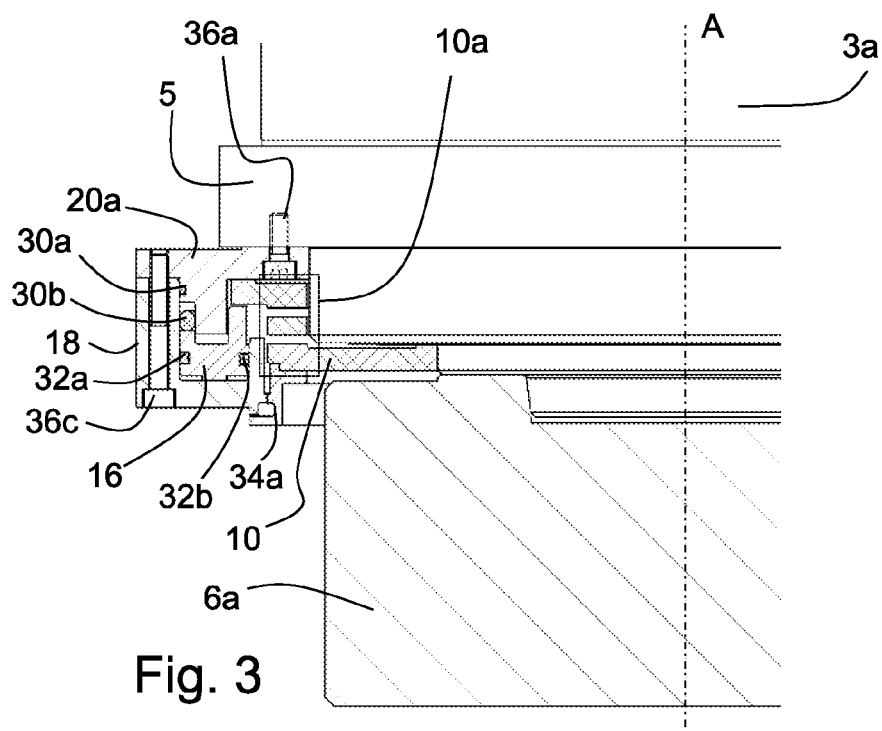
Figure 4:
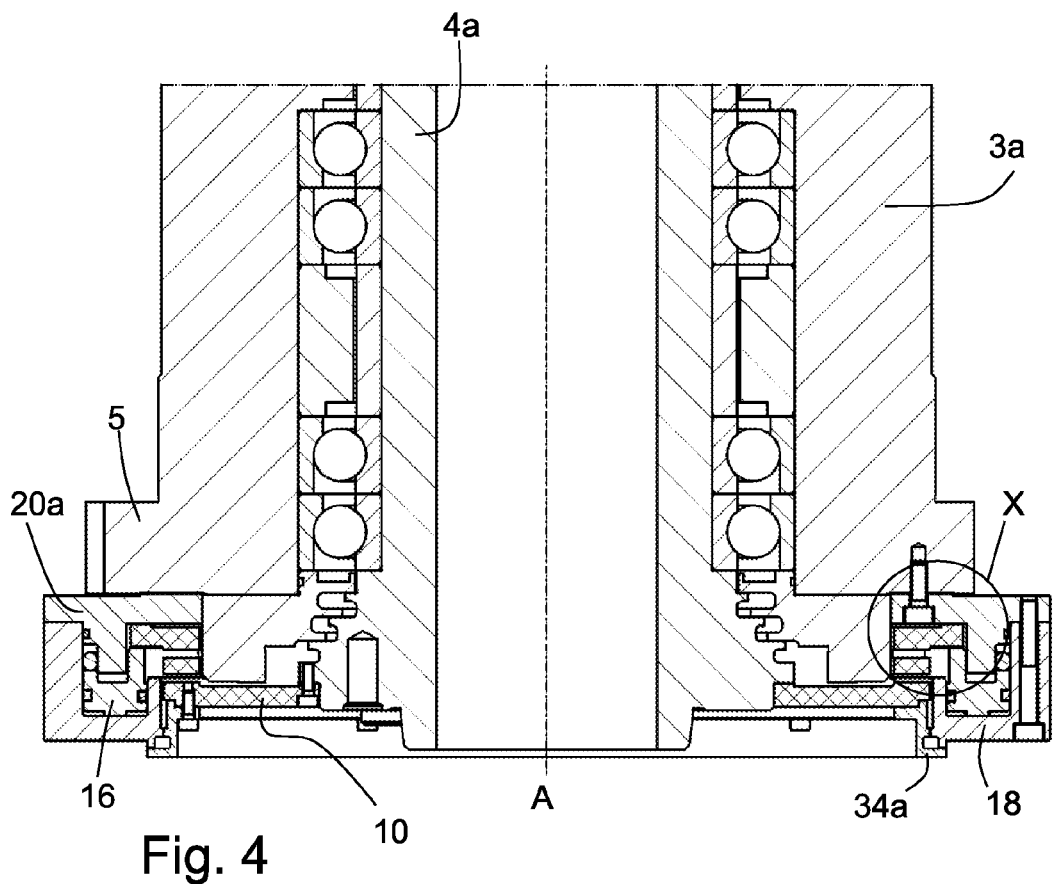
FIG. 4 is a sectional view of the spindle head of the spindle unit of FIG. 1b.

FIG. 3 and FIG. 4 each show a (partial) sectional view of the spindle head of the spindle unit 2a of FIGS. 1a and 1b in the region of the clamping device 9a. FIG. 5a-b show details of the sectional view of FIG. 4 for illustrating the function of the clamping device 9a.

In the figures, the clamping device 9a can be seen in released position or posture (FIG. 5b). For example, between the receiving flange 20a (or clamping surface 22) and clamping disk 10, a clamping gap 24 is present in released position such that the spindle shaft 4a runs freely or is not clamped. By means of the clamping disk 10 and the annular piston 16, the clamping surface 22 of the clamping disk 10 can be brought into abutment on the clamping surface 14 of the fixed or rotationally rigid receiving flange 20a such that the spindle shaft 4a is rotationally fixedly locked via the stationary spindle flange 5, the receiving flange 20a and the clamping disk 10 with blocked position. With this arrangement, the spindle shaft 4a can be locked or clamped in any angular position upon actuation of the clamping device 9a.

The locking or clamping of the spindle shaft 4a in a desired angular position is controlled by means of a control (not shown) of the spindle unit (or a machining device). For example, by means of a rotary encoder 40 (FIG. 9), the angular position of the spindle shaft 4a can be controlled. To actuate the clamping device 9a (i.e. to clamp the spindle shaft 4a), the annular piston 16 presses against the clamping disk 10 and presses the clamping disk 10 (or the flange 11) against the receiving flange 20a (or the clamping surface 22 thereof). To this, via a first pressure connection 26, a fluid (e.g. pressurized air or hydraulic fluid) is introduced into a cavity between annular piston 16 and cylinder flange 18. Thus, the annular piston 16 is pressed upwards (FIG. 5a) against the clamping disk 10 until the clamping disk 10 (or the clamping surface 14 thereof) abuts on the receiving flange 20 (or the clamping surface 22 thereof). By the hydraulically or pneumatically generated contact pressure of the annular piston 16, the adjusted angular position of the spindle shaft 4a is secured. In FIG. 5a, the progression of the force flow through the clamping disk 10 with clamped spindle shaft 4a is indicated by a double arrow.

After clamping, a workpiece chucked in the spindle unit 2a can for example be machined with a grinding tool, a milling cutter or a drill. Even high torsion forces acting in machining are effectively diverted to the rotationally stationarily supported housing of the spindle unit 2a by the clamping device such that highly precise machining is enabled. If the clamping device 9a is again released, the same workpiece can be rotationally machined without re-chucking or re-clamping of the workpiece being required.

In order to release the clamping device 9a (i.e. the spindle shaft 4a is freely movable), a fluid is supplied into a further cavity between receiving flange 20a and annular piston 16 via a second pressure connection 28, such that the clamping surfaces 14, 22 are separated and are again spaced to each other such that the spindle shaft 4a is again freely movable. To ensure a (fluid) tight connection of the cavities adjoining the pressure connections 26, 28, several seals are provided. The annular piston has a quadring 32a, 32b (O-ring with nearly or substantially square or rectangular cross-section) circumferentially on its sides located outside and inside in radial direction, respectively, and an O-ring 30b on its outer side. The receiving flange 20a has a circumferential O-ring 30a on its outer circumference.

FIG. 6a-e show various views of the clamping disk 10 of the clamping device 9a. The clamping disk 10 is integrally constructed, wherein the clamping surface 14 is formed on its circumferential flange 11. On its inner circumference, the clamping disk 10 has a plurality of screw holes 38 to screw the clamping disk 10 to the spindle shaft 4a. The clamping surface 14 of the clamping disk 10 and the clamping surface 22 of the receiving flange 20a are smooth metallic surfaces and they do not have meshing structures such as an indentation, respectively. Thereby, the spindle shaft 4a can be clamped in any angular position, i.e. the clamping device 9a does not preset any raster. Alternatively, one of the clamping surfaces 14, 22 or both clamping surfaces 14, 22 can have a coating or be treated such that increased friction between the clamping surfaces 14, 22 (pressed together) is generated. Thereby, the static friction and thereby the retaining force is increased (with consistent contact pressure).

Figure 6A:
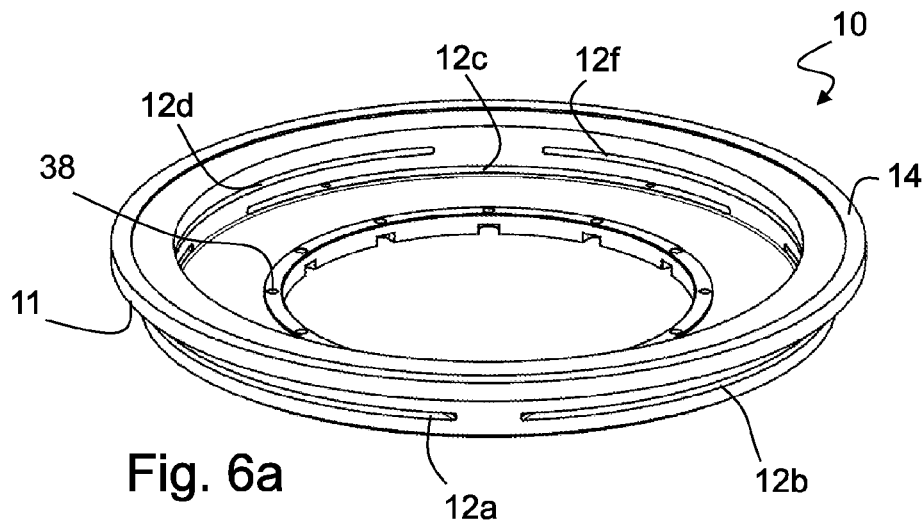
FIG. 6a-e provides various views of a clamping disk of the clamping device of FIG. 5a-b.
Figure 6B:
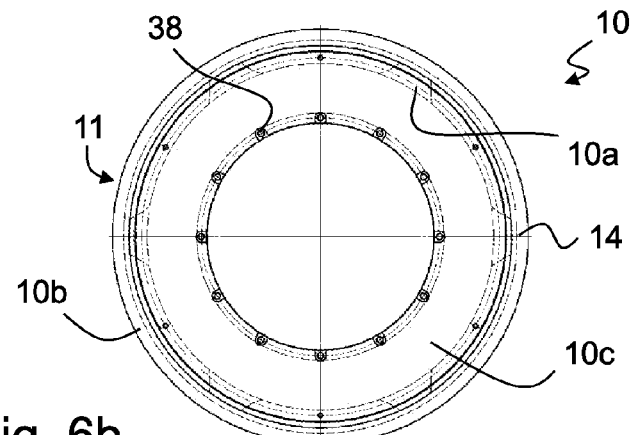
Figure 6C:
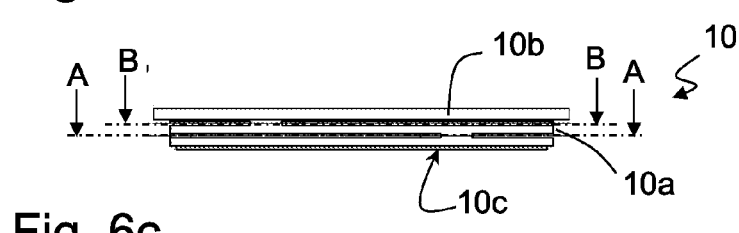

As illustrated in FIG. 6c, the clamping element 10 has a first annular section 10b, a cylindrical or cone envelope shaped section 10a (cf. FIG. 3 with the dotted illustrated rectangle) and a second annular section 10c. The cylinder envelope shaped section 10a is elastically deformable in axial direction. In an embodiment, only one annular section can also be provided. As already explained, the annular section 10b acts as a clamping disk or an element to be clamped and the annular section 10c serves for attaching the clamping element to the spindle shaft 4a. Preferably, the first annular section 10b, the cylinder envelope shaped section 10a and the second annular section 10c are integrally or monolithically formed. Preferably, the clamping element is formed of solid material, for example stainless steel (spring steel).

Figure 6D:
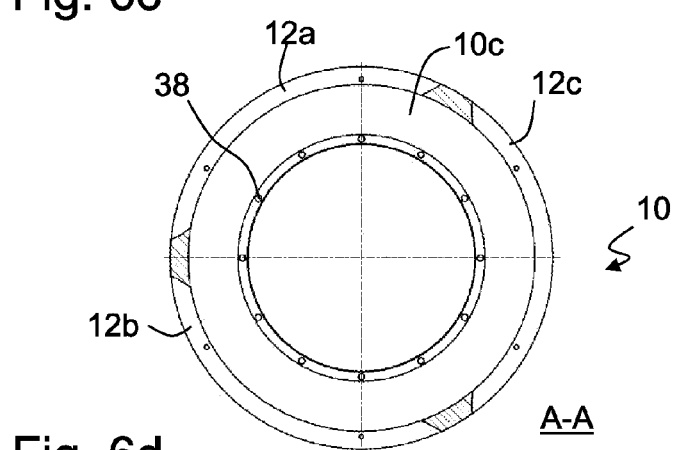
Figure 6E:
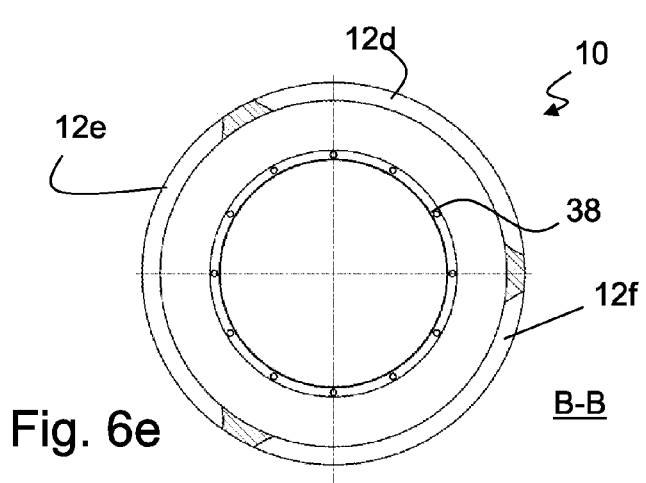

FIGS. 6d and 6e show sectional views of the clamping disk 10 along the axially offset planes A-A and B-B (FIG. 6c) perpendicular to the drive axis A. It is well recognizable that the clamping disk 10 has six elongated recesses or slots 12a-f along its circumference, which are preferably formed in the cylindrical section 10a. Three slots 12a-c and 12d-f are respectively provided in each plane located perpendicularly to the axis A. The slots 12a-f of each plane are disposed offset to each other such that the clamping disk 10 is elastic or resilient in axial direction.

If the clamping device 9a is released, the clamping disk 10 is at rest, i.e. the clamping surfaces 14, 22 do not abut on each other. Upon actuating the clamping device 9a, the clamping disk 10 is stretched in axial direction or axially elongated by means of the (hydraulically or pneumatically driven) pressure piston 16. If the clamping device 9a is subsequently again to be released, the pressure piston 16 is pneumatically or hydraulically actuated as described above. In addition, the release of the clamping device 9a is supported by the restoring force of the elastic clamping disk 10. If for example the hydraulic or pneumatic actuation has a malfunction, then, the elastic or resilient clamping disk 10 ensures that the spindle shaft 4a is free running or not clamped in any event.

In a further implementation not illustrated, the clamping disk 10 can be differently formed. For example with a cylinder envelope shaped or cone envelope shaped section 10a, which can also be elastically extended and compressed in axial direction without torsion. Here, cylinder envelope shaped or cone envelope shaped relates to the exterior dimension contour.

Figures 7A, 7B:
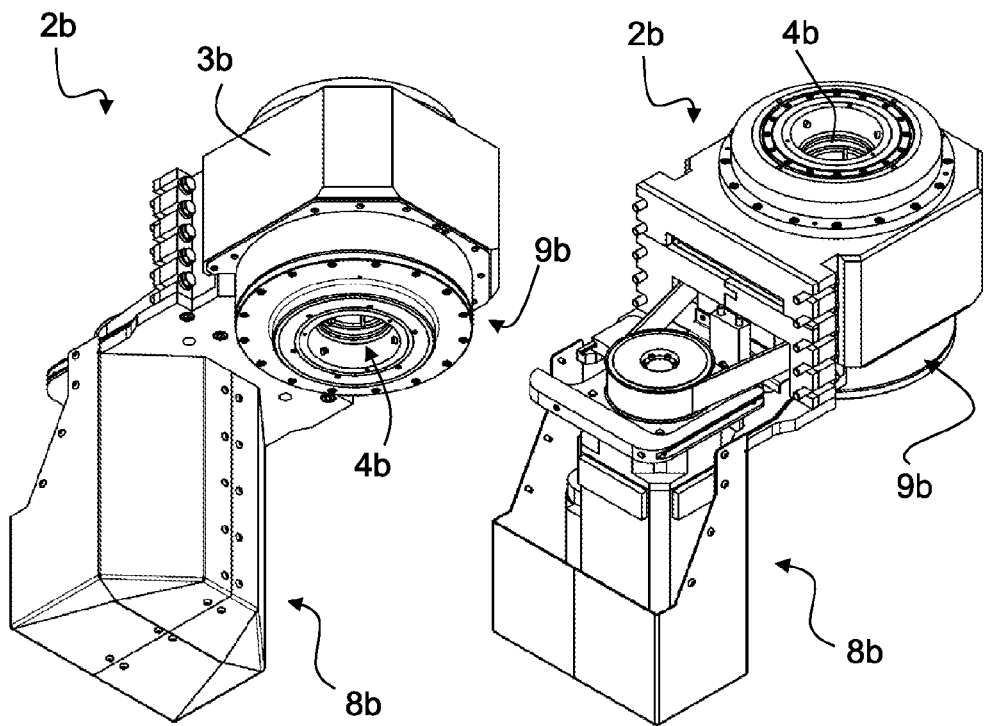
FIG. 7a-c are perspective views and plan view of a center drive assembly with a clamping device according to a further embodiment.
Figure 7C:
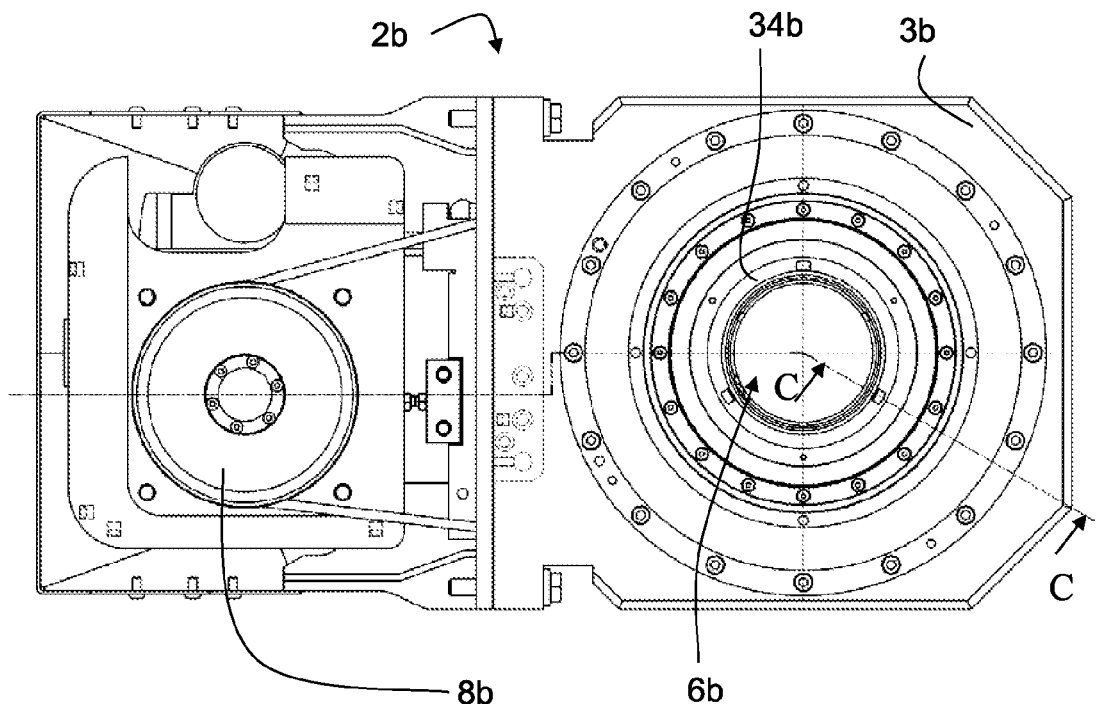

FIG. 7a-c show perspective views and a plan view of a further spindle unit 2b in the form of a center drive assembly or a center lathing spindle. Unless otherwise stated, the elements and functions of the spindle unit 2b described in the following correspond to the elements and functions of the above described spindle unit 2a. Identical elements and features causing the same effect, respectively, are identified with the same reference characters.

Unlike the above described motor spindle unit 2a, the center drive assembly 2b has a continuous opening or chucking device 6b for receiving and retaining (clamping) an (elongated) workpiece. The center chuck between the two ends of a workpiece offers the advantage that in a chuck (without re-clamping or re-chucking) both ends of the workpiece can be machined. The motor drive 8a is disposed radially offset to the drive axis A of the spindle shaft 4b.

The spindle shaft 4b of the center drive assembly is supported in a housing 3b rotatable around a drive axis A. At an end of the spindle shaft 4b or adjacent to an end of the spindle shaft 4b, a clamping device 9b is disposed to clamp the spindle shaft 4b in torsionally secure manner at a predetermined angular position. Unless otherwise stated, the elements of the clamping device 9b described in the following correspond to the above described clamping device 9a. Identical elements or elements providing the same effects or functional features are identified with the same reference characters.

Figure 8:
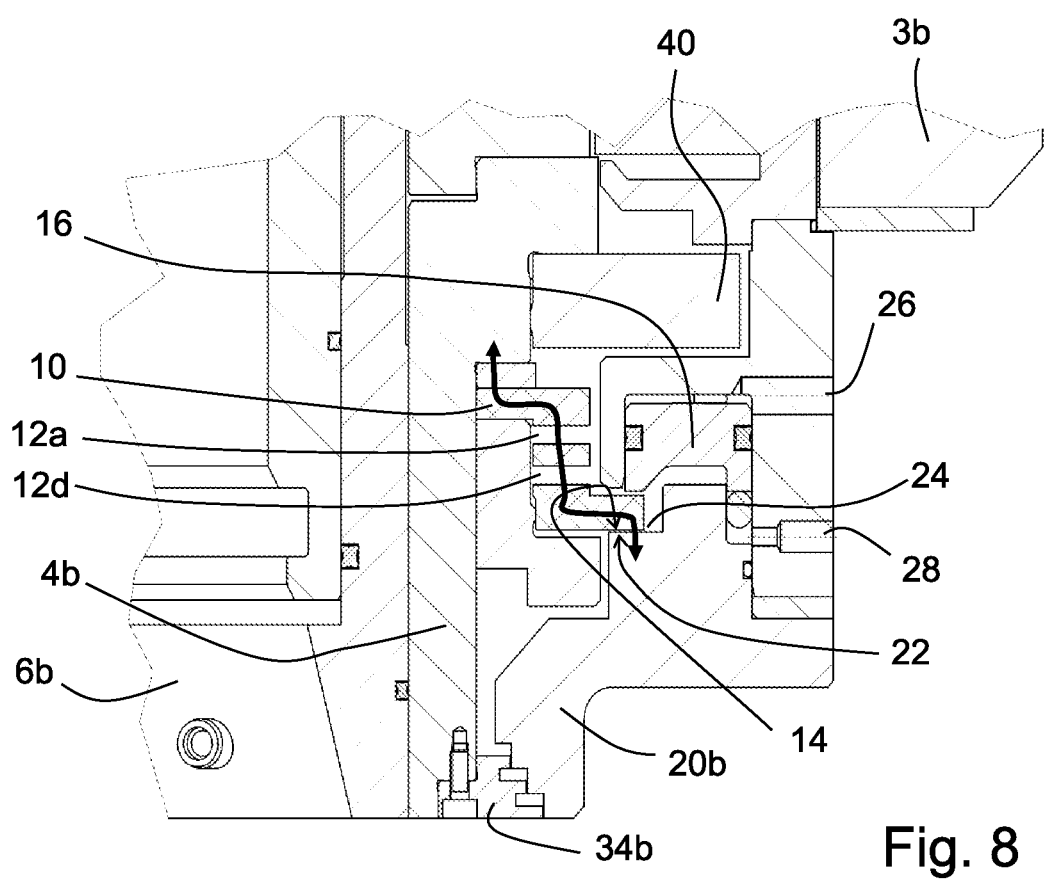
FIG. 8 provides detail of the clamping device of the center drive assembly of FIG. 7a-c.

FIG. 8 shows a sectional view of a detail of the clamping device 9b of the spindle unit 2b (lower part of the section C-C in FIG. 7c). An end of a clamping disk 10 is attached to the spindle shaft 4b by means of screws. The axially opposing (or substantially opposing) end of the clamping disk 10 has a clamping surface 14 extending perpendicularly to the drive axis A. As described above, the clamping surface 14 of the clamping disk 10 is disposed such that it opposes a corresponding clamping surface 22 of a stationary receiving flange 20b. An annular piston 16 described as above is adapted to press the clamping disk 10 against the receiving flange 20b. To this, a pressure connection 26 and 28 for clamping or for releasing the clamping device 9b or the clamping disk 10 is respectively provided on the spindle unit 2b, as described above. A labyrinth ring 34b is provided between the rotatable spindle shaft 4b and the stationary spindle flange or receiving flange 20b to provide a seal therebetween in the form of a labyrinth seal.

As described above, the clamping disk 10 is provided with multiple slots 12a-f located perpendicularly to the drive axis A to ensure elastic or resilient deformability of the clamping disk 10. The clamping device 9b is actuated and released like the above described clamping device 9a. The force flow through the clamping disk 10 with actuated clamping device 9b is indicated by the double arrow.

Both configurations of the spindle unit 2a and 2b or clamping device 9a, 9b provide an axial or substantially axially acting clamping force, which affects near the chucking device 6a, 6b or near a chucked workpiece/tool. I.e. torsion forces and leverage forces do not effect any torsion or an extremely low torsion at the clamped spindle shaft 4a, 4b. By the above described spindle units 2a, 2b the respective spindle shafts 4a, 4b can be securely retained in their (predetermined) angular position with actuated clamping device 9a, 9b.

LIST OF REFERENCE NUMERALS 2a, 2b spindle unit/main spindle
3a, 3b housing
4a, 4b spindle shaft
5 spindle flange
6a, 6b chucking device/chuck/chuck head
8a, 8b motor
9a, 9b clamping device
10 clamping disk
10a cylindrical section
10a, 10b first, second annular or disk-shaped section
11 clamping disk flange
12a-f slot
14 clamping surface (clamping disk)
16 annular piston
18 cylinder flange
20a, 20b receiving flange
22 clamping surface (receiving flange)
24 clamping gap
26 pressure connection (clamp spindle)
28 pressure connection (release spindle)
30a, 30b O-ring
32a, 32b quadring
34a, 34b labyrinth ring
36a-c cylinder screw
38 screw hole
40 rotary encoder
A drive axis

What is claimed is:
1. A spindle unit for a machining device comprising:
a housing,
a spindle shaft rotatably supported in the housing, a chucking device disposed at the spindle shaft for clamping a workpiece or a tool, a motor drive connected to the spindle shaft for driving the spindle shaft around a drive axis, a clamping device for clamping the spindle shaft at a freely selectable angular position around the drive axis, wherein the clamping device is disposed between the spindle shaft and a stationary part of the spindle unit, and an actuating device for actuating and/or releasing the clamping device, wherein the clamping device can be axially actuated in the direction of the drive axis such that an axial or substantial axial clamping force acts in the direction of the drive axis with the clamping device being actuated, wherein the clamping device comprises a clamping disk, the clamping disk comprising:

a section extending in an axial direction and which is elastically deformable in the axial direction, wherein the section extending in the axial direction comprises a cylinder envelope shaped or cone-shaped exterior dimension shape, a first annular section projecting from the outer circumference of the section extending in radial direction, wherein the first annular section comprises a first clamping surface, and a second section mounted to the spindle shaft for fixing the clamping disk rotationally rigidly to the spindle shaft such that, when the clamping device is in a released state, the clamping disk rotates together with the spindle shaft, wherein the clamping device further comprises a second clamping surface rotationally rigidly connected to the housing of the spindle unit and which is disposed opposing and parallel to the first clamping surface, wherein the section of the clamping disk extending in the axial direction is formed circumferentially around the spindle shaft, the first annular section is fixed to one end of the section extending in the axial direction and the second section is fixed to the other end of the section extending in the axial direction, and wherein the first and the second clamping surfaces are formed smooth.

2. The spindle unit according to claim 1, wherein the second section is annular.

3. The spindle unit according to claim 1, wherein the section of the clamping disk which is extending in an axial direction comprises at least two or three elongated recesses in a plane perpendicular or substantially perpendicular to the drive axis such that the clamping disk is elastically deformable in the axial direction.

4. The spindle unit according to claim 3, wherein the clamping disk of the clamping device comprises at least two or three further elongated recesses in at least a second plane perpendicular or substantially perpendicular to the drive axis, and wherein the recesses of the first and the second plane are disposed azimuthally offset to each other or angularly offset to each other.

5. The spindle unit according to claim 1, wherein the second clamping surface is disposed on an end face or in the region of an end face of the housing of the spindle unit, which is situated on a side of the chucking device.

6. The spindle unit according to claim 1, wherein the first and/or the second clamping surface are displaceable relative to each other by means of an actuating device such that a gap is set between the clamping surfaces by means of the actuating device or the clamping surfaces abut on each other, and/or wherein the spindle shaft axially protrudes from the housing of the spindle unit on a side of the chucking device and the first clamping surface is rotationally fixedly connected to the spindle shaft via an element, which extends radially outwards from the protruding end of the spindle shaft.

7. The spindle unit according to claim 1, wherein the clamping device is adapted for axial actuation in the direction of the drive axis such that an axial or substantially axial clamping force acts in the direction of the drive axis with the clamping device being actuated.

8. The spindle unit according to claim 1, wherein the spindle unit is formed as a center lathing spindle or center drive assembly such that a rod-shaped workpiece is adapted to be clamped in a middle region of the workpiece and can be processed at both ends without re-clamping.

9. The spindle unit according to claim 1, wherein the clamping device is disposed between or substantially between an axial end of the spindle housing and the chucking device or in the region of the transition from the axial end of the spindle housing and the chucking device.

10. The spindle unit according to claim 1, wherein the first and/or the second clamping surface are displaceable in axial direction by means of the actuating device such that a gap is set between the clamping surfaces by means of the actuating device or the clamping surfaces abut on each other.

11. The spindle unit according to claim 1, wherein an axial extension of the clamping disk increases upon actuating the clamping device, and/or wherein the axial extension of the clamping disk of the clamping device decreases upon releasing the clamping device.

12. The spindle unit according to claim 1, wherein the section of the clamping disk which is extending in the axial direction is formed axially resilient or elastic in the direction of the drive axis.

13. The spindle unit according to claim 1, wherein the first clamping surface and the second clamping surface abut on each other for clamping and form a gap between them in the released state of the clamping device, wherein the first and the second clamping surfaces do not comprise an indentation and do not comprise an angular division.

14. A machining device having at least one spindle unit according to claim 1, wherein the machining device comprises a vertical lathe, a horizontal lathe or a milling machine.

15. A method for locking a spindle unit according to claim 1, wherein the spindle unit comprises the clamping device having the clamping disk and the clamping disk comprises the first clamping surface, which is displaceable towards the second clamping surface for effecting clamping, the method comprising:

positioning the spindle shaft in a predefined angular position until the spindle shaft assumes the predefined angular position, and locking the spindle shaft in the predefined angular position by displacing the clamping disk or a section of the clamping disk until the first and the second clamping surface abut on each other.

16. The method of claim 15 wherein the step of positioning the spindle shaft in the predefined angular position is performed by controlling a motor drive.

17. The method of claim 15 further comprising deactivating and/or interrupting a voltage and current supply to a motor drive such that the control of the motor provides deactivation of at least an angular positioning or provides switching the motor free of force.

* * * * *